(12) United States Patent
Zheng et al.

(10) Patent No.: US 8,428,030 B2
(45) Date of Patent: Apr. 23, 2013

(54) ADDRESSING SCHEME FOR A RELAY NETWORK SYSTEM

(75) Inventors: Haihong Zheng, Coppell, TX (US); Shashikant Maheshwari, Irving, TX (US); Yousuf Saifullah, Richardson, TX (US)

(73) Assignee: Nokia Siemens Networks Oy, Espoo (FI)

( * ) Notice: Subject to any disclaimer, the term of this patent is extended or adjusted under 35 U.S.C. 154(b) by 727 days.

(21) Appl. No.: 12/607,596

(22) Filed: Oct. 28, 2009

(65) Prior Publication Data

US 2010/0111061 A1 May 6, 2010

Related U.S. Application Data

(60) Provisional application No. 61/109,470, filed on Oct. 29, 2008.

(51) Int. Cl.
| | |
|---|---|
| *H04W 4/00* | (2009.01) |
| *H04J 1/10* | (2006.01) |
| *H04L 12/28* | (2006.01) |

(52) U.S. Cl.
USPC ............ 370/331; 370/315; 370/338; 370/400

(58) Field of Classification Search .......... 370/312–405; 455/7, 411
See application file for complete search history.

(56) References Cited

U.S. PATENT DOCUMENTS

| | | | |
|---|---|---|---|
| 2007/0097945 A1* | 5/2007 | Wang et al. | 370/349 |
| 2008/0212513 A1* | 9/2008 | Tao et al. | 370/315 |
| 2009/0141668 A1* | 6/2009 | Zhang et al. | 370/315 |

FOREIGN PATENT DOCUMENTS

| | | |
|---|---|---|
| EP | 1981223 A1 | 10/2008 |
| WO | 2007/131347 A1 | 11/2007 |

OTHER PUBLICATIONS

International Search Report and Written Opinion received for International Application No. PCT/EP2009/063628, mailed on Feb. 19, 2010, 16 pages.
Related PCT Application No. PCT/EP2008/061983, filed on Sep. 10, 2008.
Cudak, Mark, "IEEE 802.16m System Requirements", IEEE 802.16m Broadband Wireless Access Working Group, IEEE 802.16m-07/002r4 (Oct. 19, 2007), 26 pages.
"IEEE Standard for Local and metropolitan area networks; Part 16: Air Interface for Fixed Broadband Wireless Access Systems", IEEE Std. 802.16-2004 (Oct. 1, 2004), 893 pages.
"IEEE Standard for Local and metropolitan area networks; Part 16: Air Interface for Fixed Broadband Wireless Access Systems; Amendment 2: Physical and Medium Access Control Layers for Combined Fixed Mobile Operation in Licensed Bands; and Corrigendum 1", IEEE Std 802.16e-2005 and IEEE Std 802.16-2004/Cor1-2005, Amendment and Corrigendum to IEEE Std 802.16-2004 (Feb. 28, 2006), 863 pages.

* cited by examiner

*Primary Examiner* — Afsar M. Qureshi
(74) *Attorney, Agent, or Firm* — Brake Hughes Bellermann LLP

(57) ABSTRACT

According to one general aspect, a method may include collecting at least one Mobile Station (MS) Medium Access Control (MAC) Packet Data Units (PDUs), associated with at least one Mobile Station. In various embodiments, the method may also include generating at least one MS station identifier (STID) sub-header (MSID-SH), indicating for each MS MAC PDU (MPDU) a MS STID that is associated the respective MPDU. In some embodiments, the method may include packing the MSID-SH and the at least one of MPDU into a single Relay MAC PDU (RPDU). In various embodiments, the method may also include wirelessly transmitting the RPDU.

17 Claims, 9 Drawing Sheets

200

400

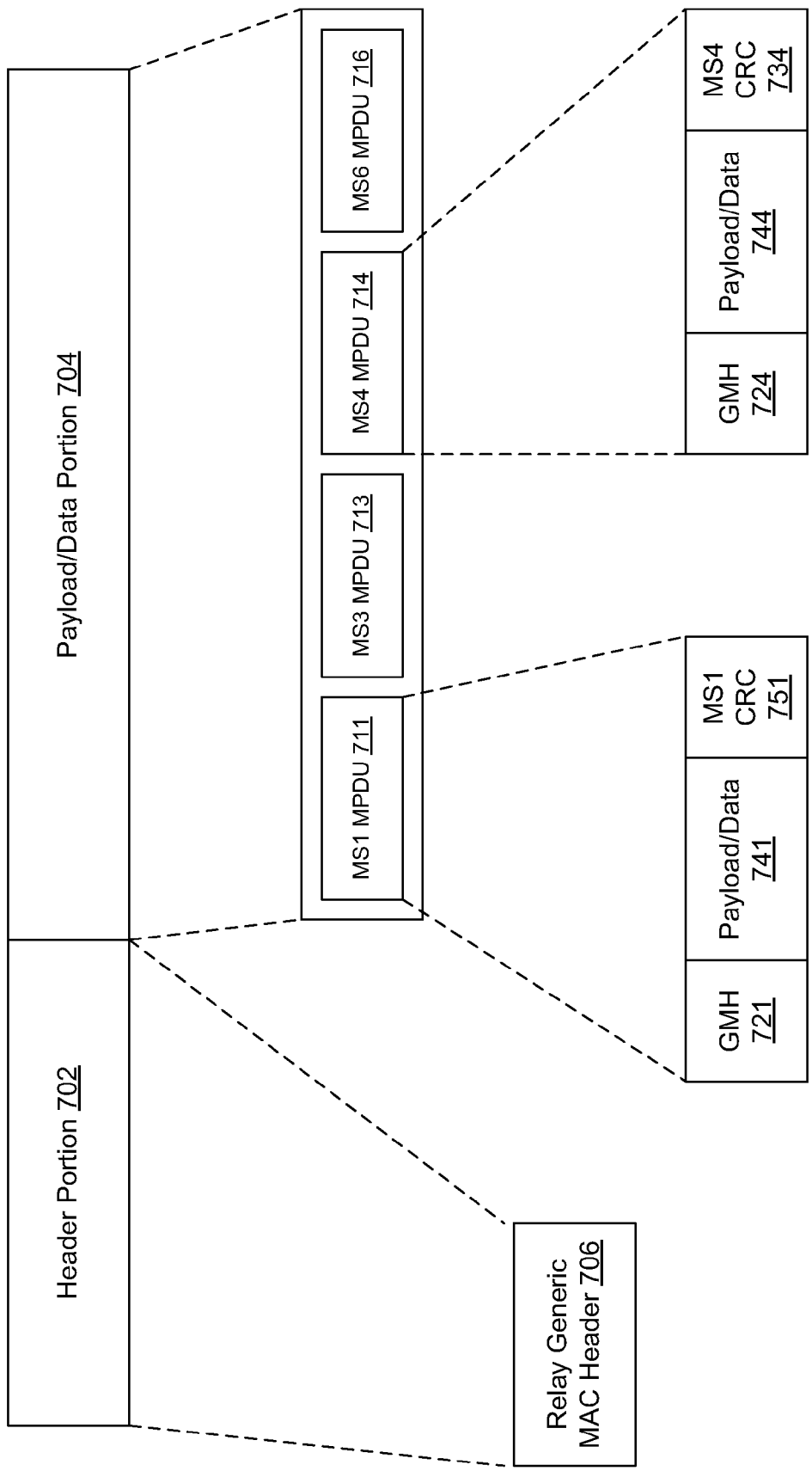

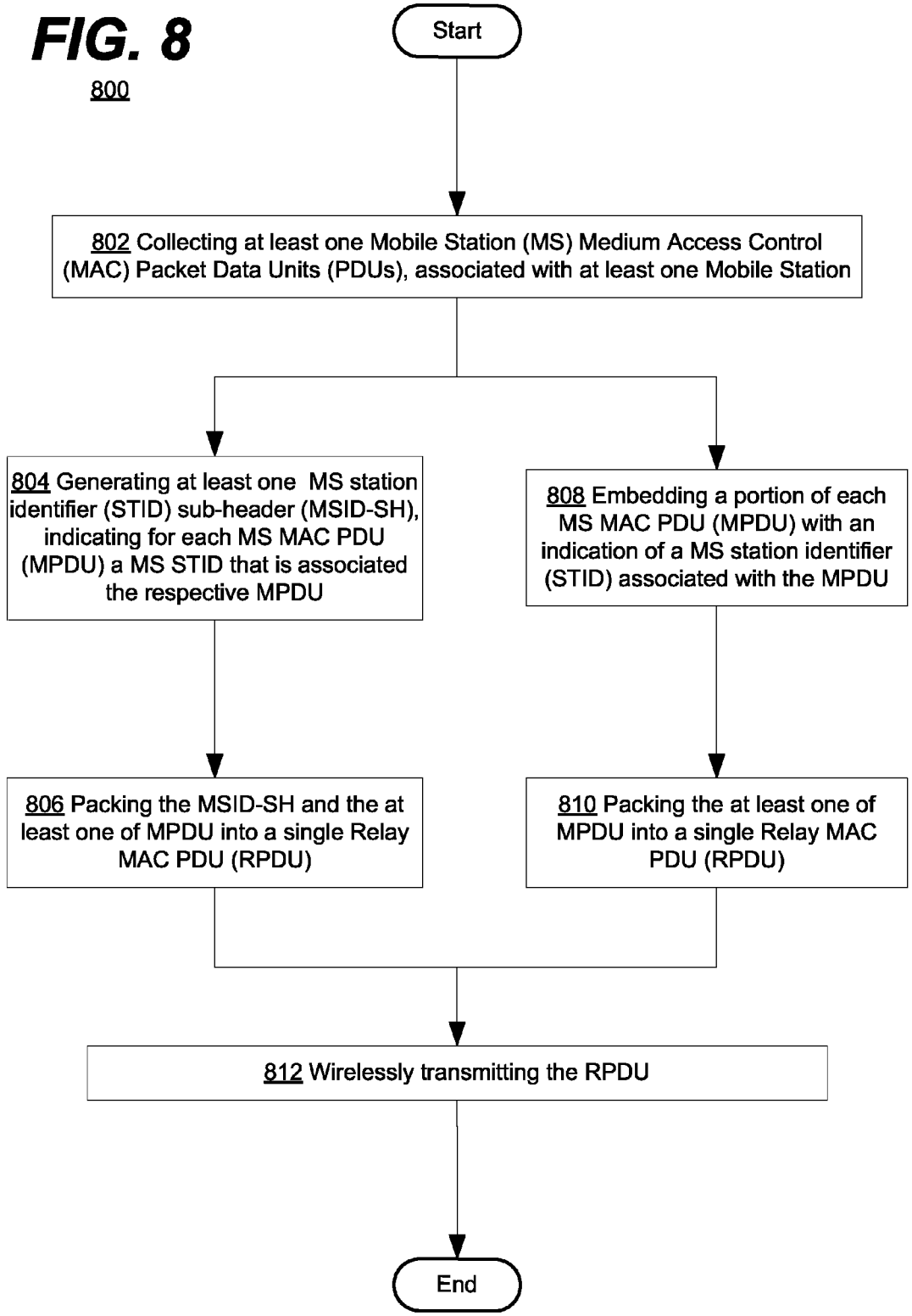

FIG. 9
900

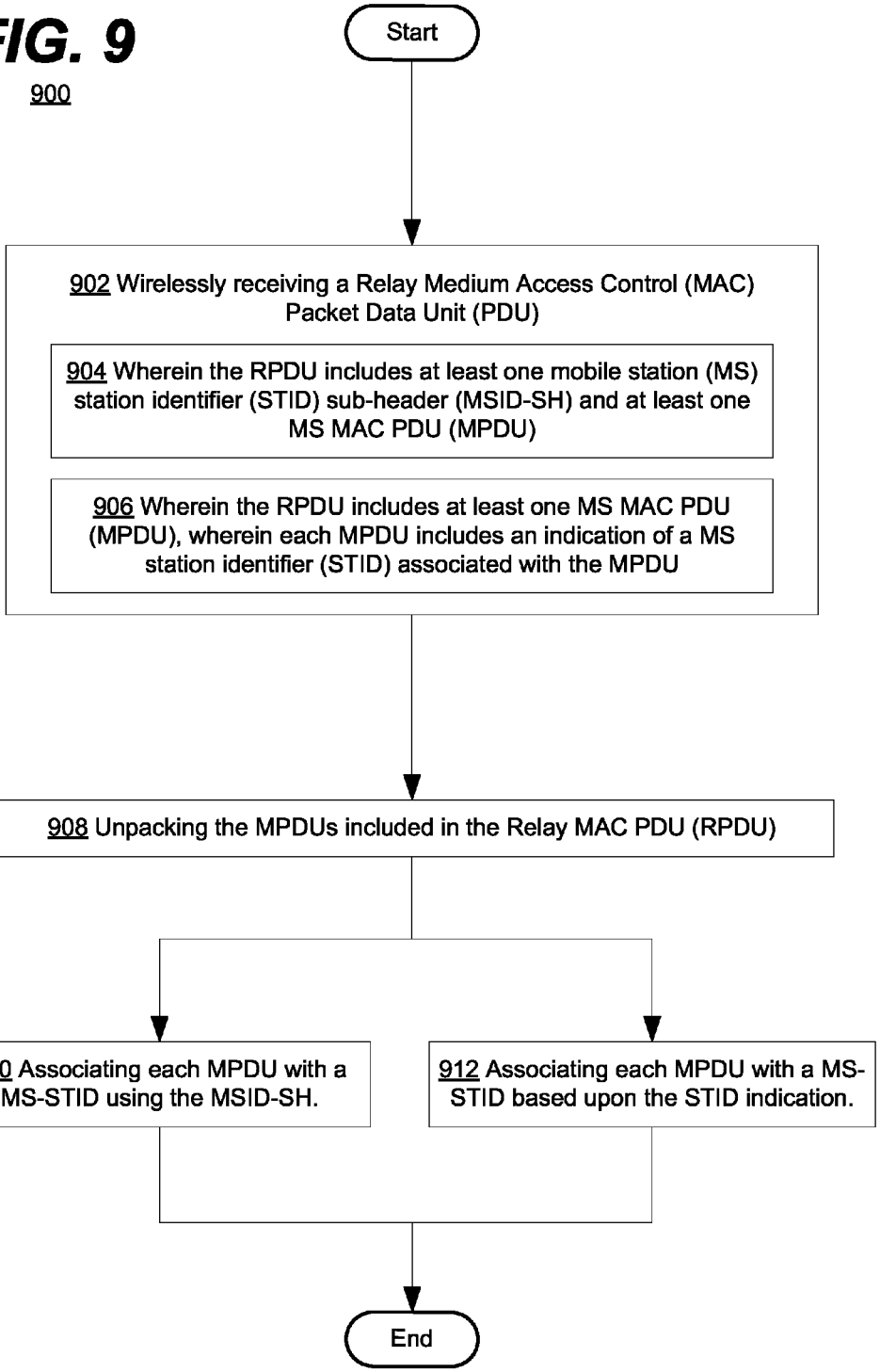

```
                    Start
                      │
                      ▼
┌─────────────────────────────────────────────────────┐
│ 902 Wirelessly receiving a Relay Medium Access      │
│ Control (MAC) Packet Data Unit (PDU)                │
│ ┌─────────────────────────────────────────────────┐ │
│ │ 904 Wherein the RPDU includes at least one      │ │
│ │ mobile station (MS) station identifier (STID)   │ │
│ │ sub-header (MSID-SH) and at least one           │ │
│ │ MS MAC PDU (MPDU)                               │ │
│ └─────────────────────────────────────────────────┘ │
│ ┌─────────────────────────────────────────────────┐ │
│ │ 906 Wherein the RPDU includes at least one MS   │ │
│ │ MAC PDU (MPDU), wherein each MPDU includes an   │ │
│ │ indication of a MS station identifier (STID)    │ │
│ │ associated with the MPDU                        │ │
│ └─────────────────────────────────────────────────┘ │
└─────────────────────────────────────────────────────┘
                      │
                      ▼
┌─────────────────────────────────────────────────────┐
│ 908 Unpacking the MPDUs included in the Relay       │
│ MAC PDU (RPDU)                                      │
└─────────────────────────────────────────────────────┘
              │                       │
              ▼                       ▼
┌──────────────────────────┐  ┌──────────────────────────┐
│ 910 Associating each     │  │ 912 Associating each     │
│ MPDU with a MS-STID      │  │ MPDU with a MS-STID      │
│ using the MSID-SH.       │  │ based upon the STID      │
│                          │  │ indication.              │
└──────────────────────────┘  └──────────────────────────┘
                      │
                      ▼
                    End
```

ADDRESSING SCHEME FOR A RELAY NETWORK SYSTEM

CROSS-REFERENCE TO RELATED APPLICATION

This application claims priority under 35 U.S.C. §119 to Provisional U.S. Patent Application No. 61/109,470, filed Oct. 29, 2008, titled "Addressing Scheme For A Relay Network System," which is incorporated herein by reference in its entirety.

TECHNICAL FIELD

This description relates to communications, and more specifically to the transmission of addressing information in a relay network system.

BACKGROUND

Worldwide Interoperability for Microwave Access (WiMAX) is a telecommunications technology often aimed at providing wireless data over long distances (e.g., kilometers) in a variety of ways, from point-to-point links to full mobile cellular type access. A network based upon WiMAX is occasionally also called a Wireless Metropolitan Access Network (WirelessMAN or WMAN); although, it is understood that WMANs may include protocols other than WiMAX. WiMAX often includes a network that is substantially in compliance with the IEEE 802.16 standards, their derivatives, or predecessors (hereafter, "the 802.16 standard"). Institute of Electrical and Electronics Engineers, *IEEE Standard for Local and Metropolitan Area Networks, Part 16*, IEEE Std. 802.16-2004.

One particular derivative of the 802.16 standard is the 802.16m standard that attempts to increase the data rate of wireless transmissions to 1 Gbps while maintaining backwards compatibility with older networks. IEEE 802.16 Broadband Wireless Access Working Group, *IEEE 802.16m System Requirements*, Oct. 19, 2007.

SUMMARY

According to one general aspect, a method may include collecting at least one Mobile Station (MS) Medium Access Control (MAC) Packet Data Units (PDUs), associated with at least one Mobile Station. In various embodiments, the method may also include generating at least one MS station identifier (STID) sub-header (MSID-SH), indicating for each MS MAC PDU (MPDU) a MS STID that is associated the respective MPDU. In some embodiments, the method may include packing the MSID-SH and the at least one of MPDU into a single Relay MAC PDU (RPDU). In various embodiments, the method may also include wirelessly transmitting the RPDU.

According to another general aspect, an apparatus may include a processor configured to collect at least one Mobile Station (MS) Medium Access Control (MAC) Packet Data Units (PDUs), associated with at least one Mobile Station. In various embodiments, the processor may also be configured to generate at least one MS station identifier (STID) sub-header (MSID-SH), indicating for each MS MAC PDU (MPDU) a MS STID that is associated the respective MPDU. In various embodiments, the processor may also be configured to pack the MSID-SH and the at least one of MPDU into a single Relay MAC PDU (RPDU). In various embodiments, the processor may also be configured to cause the RPDU to be wirelessly transmitted.

According to another general aspect, a method including wirelessly receiving a Relay Medium Access Control (MAC) Packet Data Unit (PDU) including at least one mobile station (MS) station identifier (STID) sub-header (MSID-SH) and at least one MS MAC PDU (MPDU). In various embodiments, the method may also include unpacking the MPDUs included in the Relay MAC PDU (RPDU). In various embodiments, the method may also include associating each MPDU with a MS-STID using the MSID-SH.

According to another general aspect, an apparatus may include a processor configured to receive a Relay Medium Access Control (MAC) Packet Data Unit (PDU) including at least one mobile station (MS) station identifier (STID) sub-header (MSID-SH) and at least one MS MAC PDU (MPDU) via a wireless communications channel. In various embodiments, the processor may also be configured to unpack the MPDUs included in the Relay MAC PDU (RPDU). In various embodiments, the processor may also be configured to associate each MPDU with a MS-STID using the MSID-SH.

According to another general aspect, a method may include collecting at least one Mobile Station (MS) Medium Access Control (MAC) Packet Data Units (PDUs), associated with at least one Mobile Station. In various embodiments, the method may also include embedding a portion of each MS MAC PDU (MPDU) with an indication of a MS station identifier (STID) associated with the MPDU. In various embodiments, the method may also include packing the at least one of MPDU into a single Relay MAC PDU (RPDU). In various embodiments, the method may also include wirelessly transmitting the RPDU.

According to another general aspect, an apparatus may include a processor configured to collect at least one Mobile Station (MS) Medium Access Control (MAC) Packet Data Units (PDUs), associated with at least one Mobile Station. In various embodiments, the processor may also be configured to embed a portion of each MS MAC PDU (MPDU) with an indication of a MS station identifier (STID) associated with the MPDU. In various embodiments, the processor may also be configured to pack the at least one of MPDU into a single Relay MAC PDU (RPDU). In various embodiments, the processor may also be configured to cause the RPDU to be wirelessly transmitted.

According to another general aspect, a method may include wirelessly receiving a Relay Medium Access Control (MAC) Packet Data Unit (PDU) including at least one MS MAC PDU (MPDU), wherein each MPDU includes an indication of a MS station identifier (STID) associated with the MPDU. In various embodiments, the method may also include unpacking the MPDUs included in the Relay MAC PDU (RPDU). In various embodiments, the method may also include associating each MPDU with a MS-STID based upon the STID indication.

According to another general aspect, an apparatus may include a processor configured to receive a Relay Medium Access Control (MAC) Packet Data Unit (PDU) including at least one MS MAC PDU (MPDU), wherein each MPDU includes an indication of a MS station identifier (STID) associated with the MPDU. In various embodiments, the processor may also be configured to unpack the MPDUs included in the Relay MAC PDU (RPDU). In various embodiments, the processor may also be configured to associate each MPDU with a MS-STID based upon the STID indication.

The details of one or more implementations are set forth in the accompanying drawings and the description below. Other features will be apparent from the description and drawings, and from the claims.

A system and/or method for communicating information, substantially as shown in and/or described in connection with at least one of the figures, as set forth more completely in the claims.

BRIEF DESCRIPTION OF THE DRAWINGS

FIG. 7 is a block diagram of an example embodiment of a relay data unit in accordance with the disclosed subject matter.

FIG. 8 is a flow chart of an example embodiment of a technique in accordance with the disclosed subject matter.

FIG. 9 is a flow chart of an example embodiment of a technique in accordance with the disclosed subject matter.

DETAILED DESCRIPTION

Figure 1:
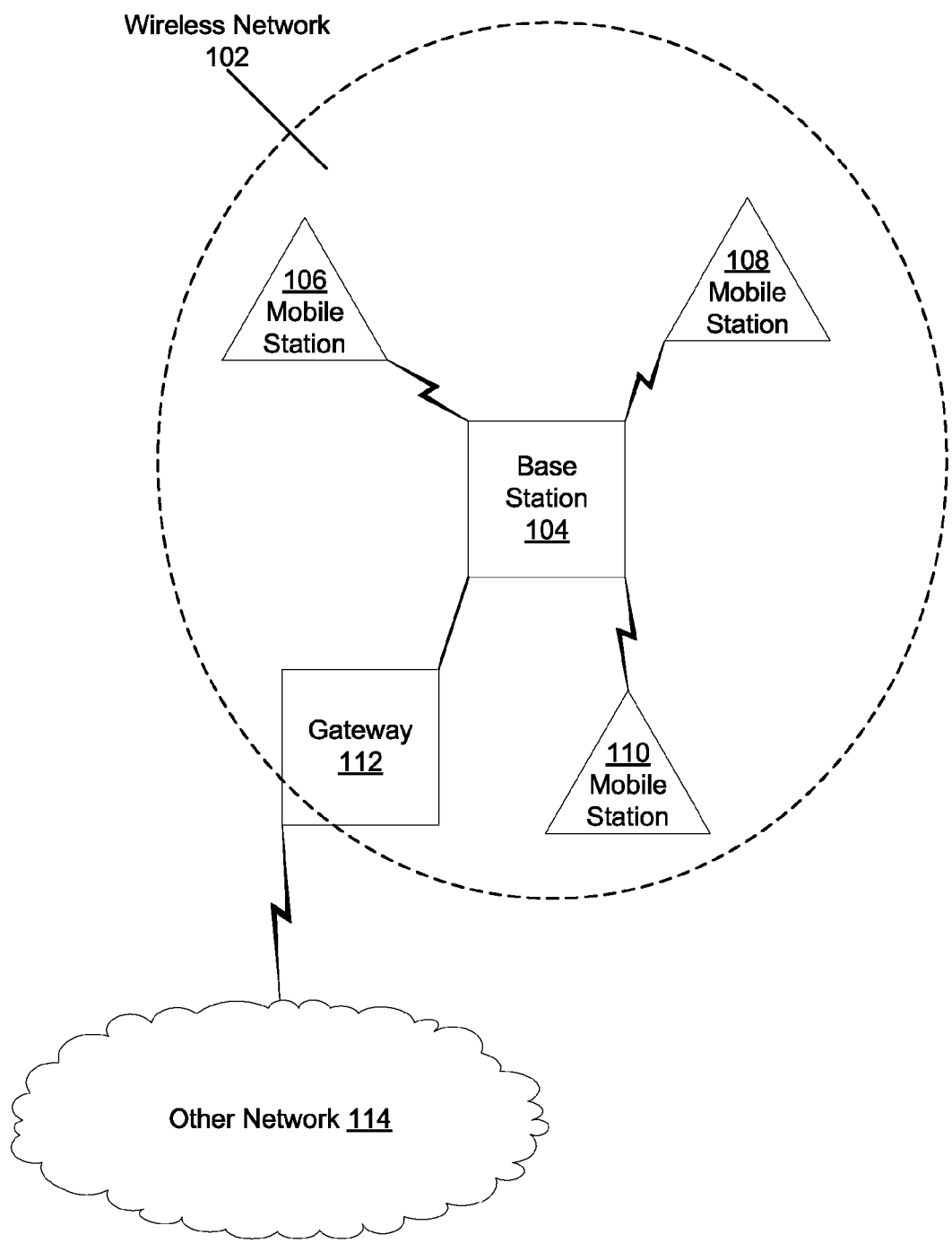
FIG. 1 is a block diagram of an example embodiment of a system in accordance with the disclosed subject matter.

Referring to the Figures in which like numerals indicate like elements, FIG. 1 is a block diagram of a wireless network 102 including a base station (BS) 104 and mobile stations (MSs) 106, 108, 110, according to an example embodiment. Each of the MSs 106, 108, 110 may be associated with BS 104, and may transmit data in an uplink (UL) direction to BS 104, and may receive data in a downlink (DL) direction from BS 104, for example. Although only one BS 104 and three mobile stations (MSs 106, 108 and 110) are shown, any number of base stations and mobile stations may be provided in network 102. Also, although not shown, mobile stations 106, 108 and 110 may be coupled to base station 104 via relay stations or relay nodes, for example. The base station 104 may be connected via wired or wireless links to another network (not shown), such as a Local Area Network (LAN), a Wide Area Network (WAN), the Internet, etc. In various embodiments, the base station 104 may be coupled or connected with the other network 114 via an access network controller (ASN) or gateway (GW) 112 that may control, monitor, or limit access to the other network.

Figure 2:
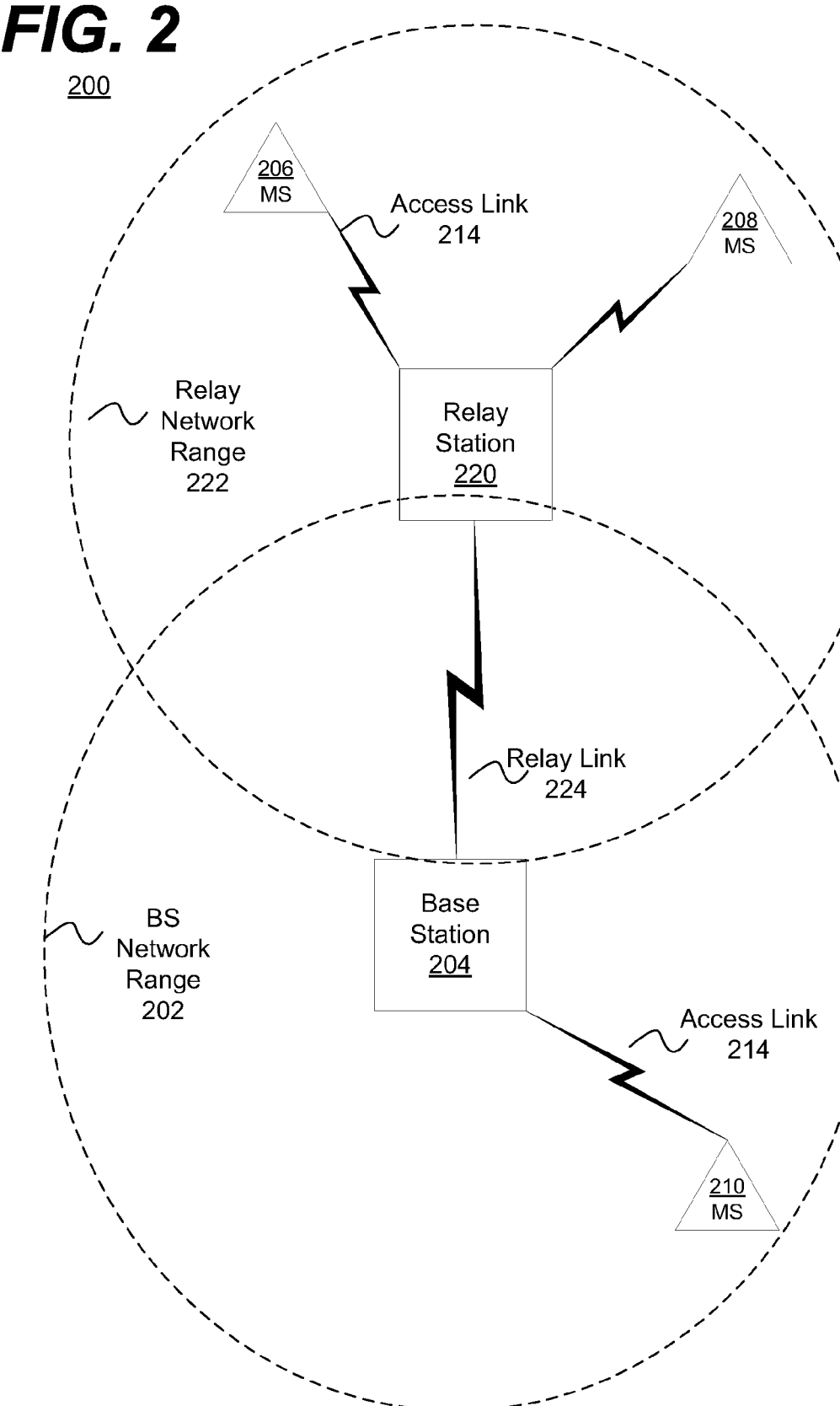
FIG. 2 is a block diagram of an example embodiment of a system in accordance with the disclosed subject matter.

FIG. 2 is a block diagram of an example embodiment of a system 200 in accordance with the disclosed subject matter. As described above, in various embodiments, the MSs may be in communication with the BS via a relay station. In one embodiment, the system 200 may include a BS 204 in direct communication with a MS 210 and a relay station (RS) 220. The RS 220 may be in direct communication with the MSs 206 and 208, and the BS 204. In various embodiments, the BS 204 may have a certain wireless range 202. Likewise the RS 220 may have a wireless range 222.

In various embodiments, the MSs 206 and 208 may be too far away from the BS 204 to allow direct communication or communication with high throughput; they may be outside of the BS network range 202. However, these two MSs 206 and 208 may be within the RS network range 222, allowing communication with the RS 220. The RS 220 may then relay messages between the MSs 206 and 208 and the BS 204. This relay may be bi-directional (e.g., both uplink and downlink) In this context, a wireless relay network may be a multi-hop system in which end nodes (e.g., MSs, subscriber stations (SSs), etc.) are connected to the BS 204 or Access Point (AP) via RS 220. All the traffic between the remote MSs 206 and 208 and BS 204 passes through and may be processed by the RS 220. In various embodiments, multiple RSs (not shown) may be figuratively chained together to link a MS with a BS.

In this context the link or communications link between the RS 220 and the BS 204 may be referred to as a relay link 224. In this context, a link or communications link ending at a MS may be referred to as an access link 214 (labeled twice to illustrate that the link terminates at an MS regardless of being attached to the RS 220 or the BS 204).

In various embodiments, the MS 106 may transmit user data or other messages (e.g., medium access control (MAC) management messages, etc.) to the BS 204 via the RS 220. Once received by the RS 220, the user data and message may be retransmitted to the BS 204. A similar operation may occur in the downlink direction.

In various embodiments, the RS 220 may amalgamate several MS user data and messages from multiple MSs (e.g., MSs 206 and 208). In such an embodiment, MS 206 may transmit a first user data and message to the RS 220 and the MS 208 may transmit a second user data and message to the RS 220. The RS 220 may then repackage these two user data and messages into a single larger user data and message. This user data or message may then be retransmitted to the BS 204. Likewise, in various embodiments, the RS 220 may break large user data or messages from an MS into smaller user data or messages for transmittal to BS 204. In various embodiments, this may be desirable to fully utilize a resource allocation assigned to the RS 220.

In various embodiments, of an 802.16 standard (e.g., 802.16m, etc.) an addressing scheme may be used in which each MS is identified by a substantially unique Station Identifier (STID). Furthermore, in various embodiments, each connection within the MS may be identified by a Flow Identifier (FID). In such an embodiment, the STID may be included in MAC protocol (MAP) messages to identify the MS to which an associated resource is assigned. Conversely, the FID and not the STID may be, in one embodiment, included in the Generic MAC Header (GMH) in a MAC Packet data unit (PDU).

In various embodiments, two types of data forwarding or relaying schemes may be used: a connection identifier (CID) based relaying or forwarding, and a tunnel based forwarding scheme. In one embodiment of a CID based forwarding scheme, each MAC PDU (MPDU) may include a MS CID, and the downlink (DL) MAP for the relay link 224 may include a MS basic CID or RS basic CID In one embodiment of a tunnel based forwarding scheme, the tunnel packet or data unit, which is referred to as relay MAC PDU (RPDU), may include a tunnel CID, and the downlink (DL) MAP for the relay link 224 may include the tunnel CID or RS's 220 basic CID. In such an embodiment, each individual MPDU in the RPDU may include the CID of each MS (e.g., MSs 206 and 208). Although, it is understood that the above are merely a few illustrative examples to which the disclosed subject matter is not limited.

In various embodiments, of an 802.16 system (e.g., an 802.16m system, etc.), a MPDU may not include an MS identifier or STID. Therefore, in such an embodiment, it may not be possible or simple for RS 220 to correctly determine the STID of a MPDU when receiving MPDUs transmitted by the BS 204 for DL traffic (to the MSs 206 and 208). Likewise, in such an embodiment, it may be difficult for the BS 204 to identify which MS (e.g., MS 206 or MS 208) a MPDU belongs to when the MPDU is received (via a RPDU) from access RS 220 as part of uplink (UL) traffic. In various embodiments, this may be especially true if a single RPDU (received by the BS 204) includes MPDUs from multiple MSs (e.g., MS 206 and MS 208).

Figure 3:
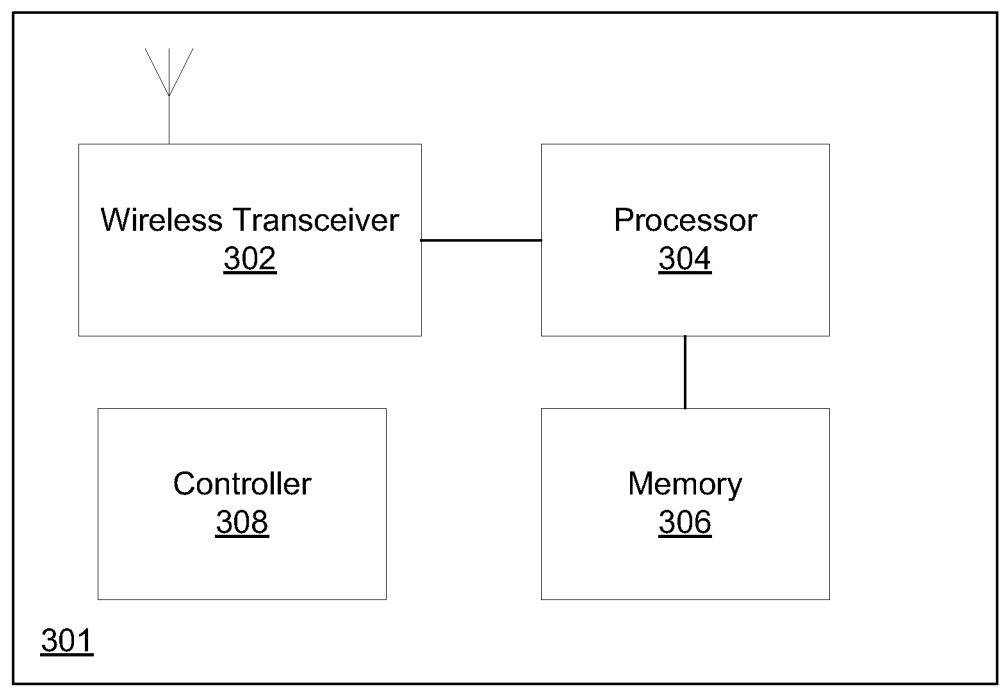
FIG. 3 is a block diagram of an example embodiment of a system in accordance with the disclosed subject matter.

FIG. 3 is a block diagram of an example embodiment of a system or apparatus 301 in accordance with the disclosed subject matter. The apparatus or wireless station 301 (e.g., base station 104, mobile station 106, relay station 220, etc.) may include, for example, an RF (radio frequency) or wireless transceiver 302, including a transmitter to transmit signals and a receiver to receive signals, a processor or baseband processor 304 to execute instructions or software and control transmission and receptions of signals, and a memory 306 to store data and/or instructions.

Processor 304 may also make decisions or determinations, generate frames or messages for transmission, decode received frames or messages for further processing, and other tasks or functions described herein. Processor 304, which may be a baseband processor, for example, may generate messages, packets, frames or other signals for transmission via wireless transceiver 302. Processor 304 may control transmission of signals or messages over a wireless network, and may receive signals or messages, etc., via a wireless network (e.g., after being down-converted by wireless transceiver 302, for example). Processor 304 may be programmable and capable of executing software, firmware, or other instructions stored in memory or on other computer media to perform the various tasks and functions described above, such as one or more of the tasks or methods described above. Processor 304 may be (or may include), for example, hardware, programmable logic, a programmable processor that executes software or firmware, and/or any combination of these. Using other terminology, processor 304 and transceiver 302 together may be considered as a wireless transmitter/receiver system, for example.

In addition, a controller (or processor) 308 may execute software and instructions, and may provide overall control for the station 301, and may provide control for other systems not shown in FIG. 3, such as controlling input/output devices (e.g., display, keypad), and/or may execute software for one or more applications that may be provided on wireless station 301, such as, for example, an email program, audio/video applications, a word processor, a Voice over IP application, or other application or software.

In addition, a storage medium may be provided that includes stored instructions, which when executed by a controller or processor may result in the processor 304, or other controller or processor, performing one or more of the functions or tasks described above.

Figure 4:
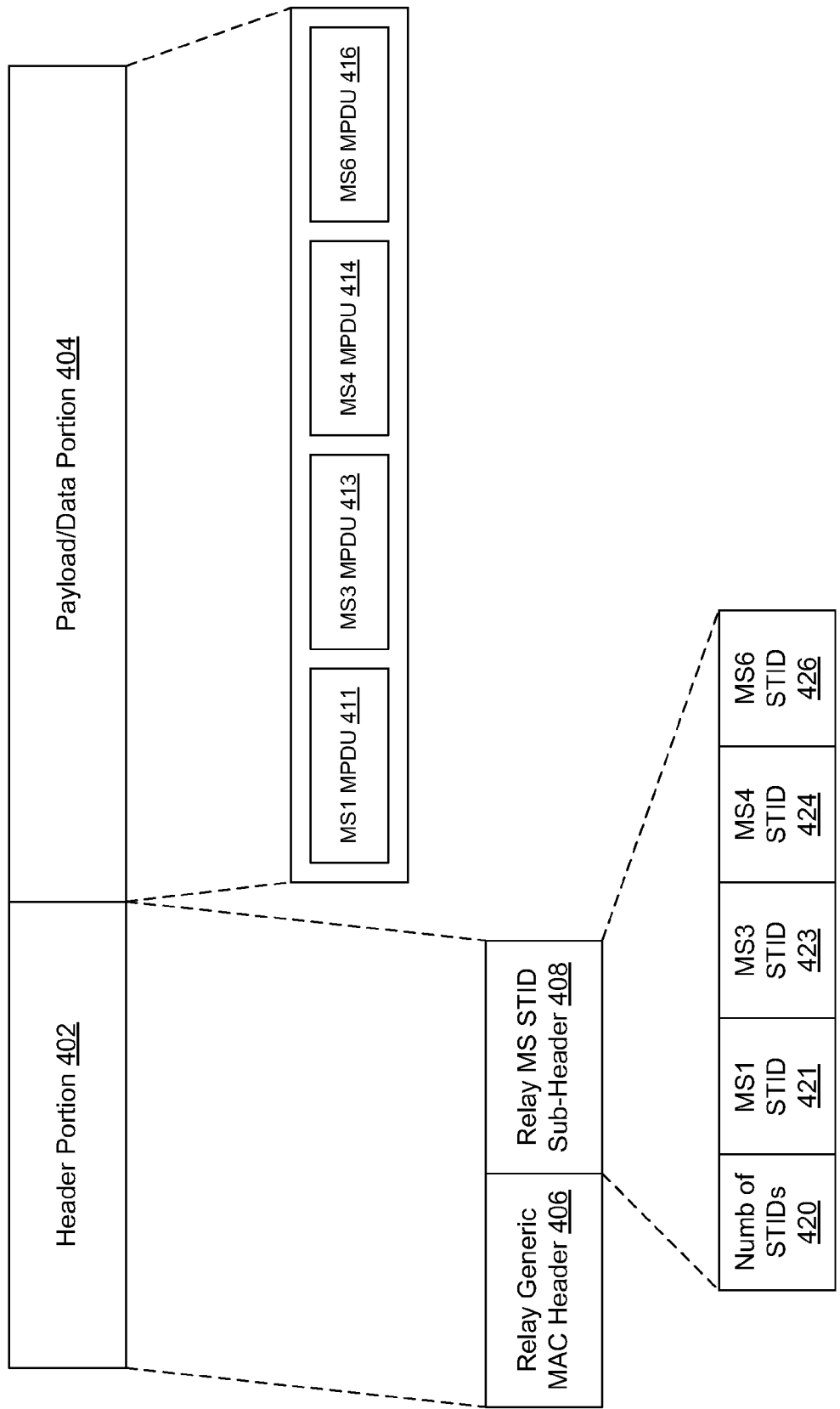
FIG. 4 is a block diagram of an example embodiment of a relay data unit in accordance with the disclosed subject matter.

FIG. 4 is a block diagram of an example embodiment of a relay packet data unit (RPDU) 400 in accordance with the disclosed subject matter. In various embodiments, the RPDU 400 may include a header portion 402 and a data or payload portion 404. In some embodiments, the RPDU 400 may be created or encoded in such a way that MPDUs (e.g., MPDU 411, etc.) may be associated with their respective MS (e.g., MS 1 or MS 106, etc.).

As described above, a RS may amalgamate or pack MPDUs (e.g., MPDU 411, etc.) from one or more MSs (e.g., MS 1 or MS 106, etc.) together. In various embodiments, the RS may receive or collect one or more MPDUs from multiple MSs. The RS may then amalgamate or pack these MPDUs into a single RPDU (e.g., RPDU 400). In various embodiments, this may involve grouping several MPDUs from a single MS into a larger or bundled MPDU. This RPDU may be transmitted to a BS or other RS. Likewise, a BS may collect one or more MPDUs to be transmitted to multiple MSs. These MPDUs may also be packed into a single RPDU and transmitted to the RS. The RS may ultimately unpack the RPDU and transmit the MPDUs to their respective MSs.

Returning to RPDU 400, in various embodiments, the payload or data portion 404 may include one or more MPDUs from one or more respective MSs. In the illustrated embodiment, MPDUs from four MSs (MS1, MS3, MS4, and MS6) are illustrated. In such an embodiment, the RS generating/receiving RPDU 400 may be associated with six MSs. In the illustrated embodiment, the payload portion 404 may include the MS1 MPDU 411, the MS3 MPDU 413, the MS4 MPDU 414 and the MS6 MPDU 416; although, it is understood that the above is merely one illustrative example to which the disclosed subject matter is not limited.

In various embodiments, the header portion 402 of the RPDU 400 may include one or more headers. In one embodiment, the RPDU 400 may include a relay generic MAC header (GMH) 406 and a Relay MS-STID sub-header (MSID-SH) 408. In various embodiments, the header portion 402 may also include a number of various other sub-headers.

In one embodiment, the MSID-SH 408 may include a plurality of MS STIDs (e.g., MS1 STID 421, MS3 STID 423, MS4 STID 424, and MS6 STID 426). In various embodiments, each of these MS STIDs may be associated with a MPDU included in the RPDU 400. In some embodiments, these MS STIDs may be ordered in the same order as the MPDUs. For example, because MS1 MPDU 411 is the first MPDU in the payload portion 404, the MS1 STID 421 may be the first MS STID in the MSID-SH 408. Likewise, because MS4 MPDU 414 is the third MPDU in the payload portion 404, the MS4 STID 424 may be the third MS STID in the MSID-SH 408, and so on. In various embodiments, the cause-and-effect of the MSID-SH 408 and payload portion 404 ordering may be reversed (e.g., the payload portion 408 may be ordered according to the MSID-SH 408 order).

In various less efficient embodiments, in which the MPDUs are not grouped by transmitting/receiving MS, a MS STID may be repeated within the MSID-SH 408. For example, if MS1 is associated with the first MPDU and third MPDU in the RPDU 400, the MSID-SH 408 may include the STID of MS1 in both a first and a third position. Although, it is understood that the above is merely one illustrative example to which the disclosed subject matter is not limited.

In one embodiment, the MSID-SH 408 may include a field 420 indicating the number of MS STIDs included in the MSID-SH 408. In various embodiments, the field 420 may indicate the length (e.g., in bits, bytes, etc.) of the MSID-SH 408. In other embodiments, the MSID-SH 408 may include a termination field or bit indicating that the end of the MSID-SH 408 has been reached. In yet another embodiment, the MSID-SH 408 may include another form of indication so that a processing device may realize when the end of the MSID-SH 408 has been reached. In various embodiments, other fields may be present in a MSID-SH 408.

In some embodiments, when the RPDU 400 is received by a device (e.g., the BS or RS), the receiving device may associate a STID with a given MPDU by correlating an MS STID from the MSID-SH 408 with a MPDU in the payload portion 404, based upon their respective order.

In various embodiments, such a MSID-SH 408 may be defined only for relay links (e.g. relay link 224 of FIG. 2). For example, data transmission over an access link (e.g., access link 214 of FIG. 2) may involve only one MS; therefore any MPDUs may be for/from that particular MS associated with the access link. Although, it is understood that the above is merely one illustrative example to which the disclosed subject matter is not limited.

Figure 5:
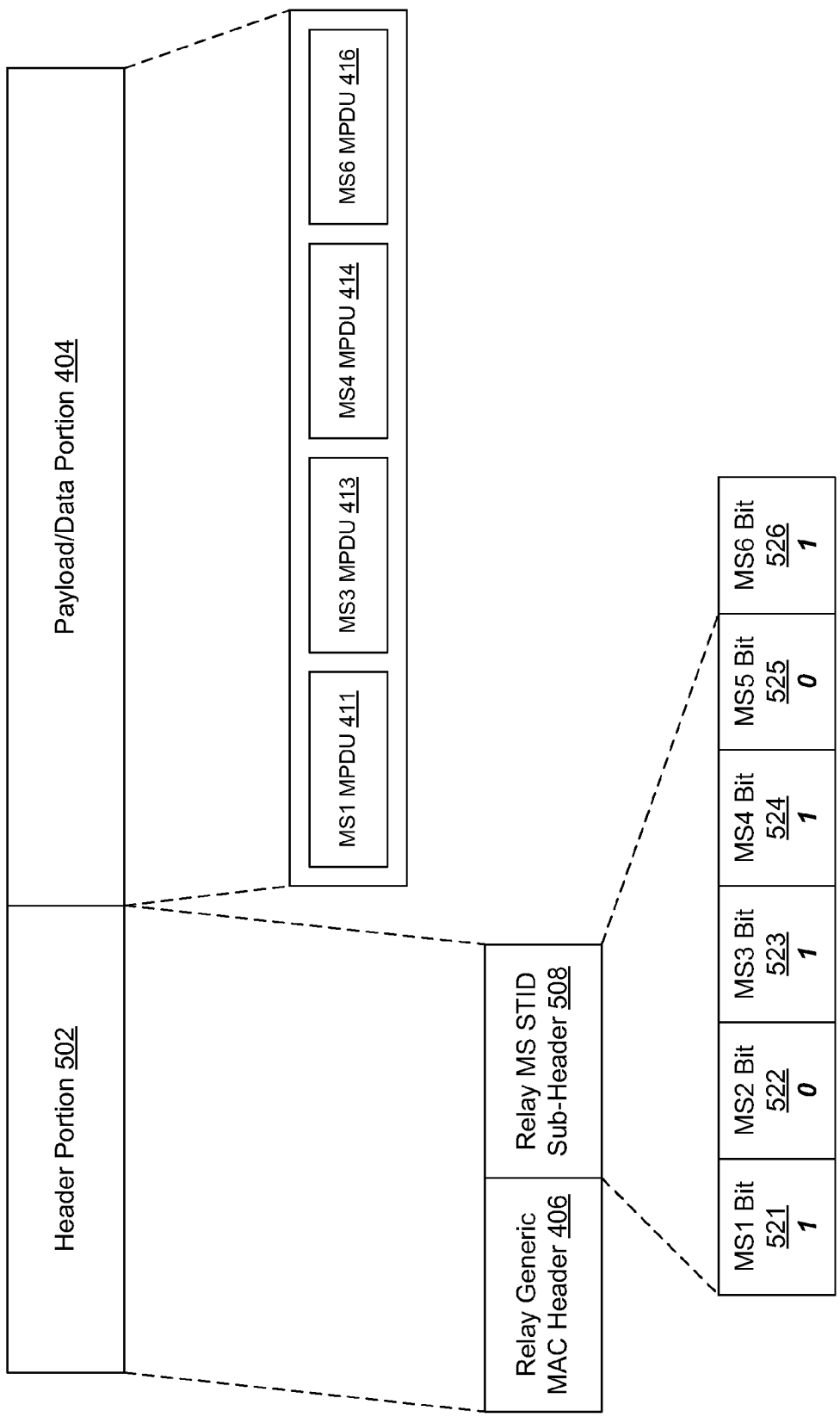
FIG. 5 is a block diagram of an example embodiment of a relay data unit in accordance with the disclosed subject matter.

FIG. 5 is a block diagram of an example embodiment of a relay data unit 500 in accordance with the disclosed subject matter. In various embodiments, the RPDU 500 may include a header portion 502 and a data or payload portion 404. In some embodiments, the RPDU 500 may be created or encoded in such a way that MPDUs (e.g., MPDU 411, etc.) may be associated with their respective MS (e.g., MS 1 or MS 106, etc.).

In various embodiments, the payload or data portion 404 of RPDU 500 may include, in one embodiment, one or more MPDUs from one or more respective MSs. For simplicity of illustration like RPDU 400 of FIG. 4, MPDUs from four MSs (MS1, MS3, MS4, and MS6) are illustrated. In such an embodiment, the RS generating or receiving RPDU 400 may be associated with six MSs. In the illustrated embodiment, the payload portion 404 may include the MS1 MPDU 411, the MS3 MPDU 413, the MS4 MPDU 414 and the MS6 MPDU 416; although, it is understood that the above is merely one illustrative example to which the disclosed subject matter is not limited.

In various embodiments, the header portion 502 of the RPDU 500 may include one or more headers. In one embodiment, the RPDU 500 may include a relay generic MAC header (GMH) 406 and a Relay MS-STID sub-header (MSID-SH) 508. In various embodiments, the header portion 502 may also include a number of various other sub-headers. As described above, the MSID-SH 508 may, in various embodiments, only be included for transmission over a relay link (e.g., relay link 224 of FIG. 2).

In various embodiments, the MSID-SH 508 may include a bitmap indicating which MSs have MPDUs included within the payload portion 404 of the RPDU 500. In some embodiments, this bitmap may be correlated with the order in which the MPDUs are packed into the payload portion 404 of the RPDU 500.

In this context, a bitmap may include a data structure which compactly stores individual bits or Boolean values. In this context, the individual bits or Boolean values may represent flags or be mapped to other more complex values (e.g., non-Boolean values). For example, an STID may be the value "0FF876439E". A particular bit in a bitmap or bit field may serve as a flag indicating that the value "0FF876439E" is really meant. In various embodiments, using a bitmap to represent a distinct set of known values may be more efficient that transmitting the larger known values. In this context, the phrase "a bitmap of STIDs", therefore, may be interpreted as "a data structure including a set of bits mapped to a set of STID values".

For example, in the illustrated embodiment, the MSID-SH 508 may include six bits, one for each MS associated with the RS generating or receiving the RPDU 500. The bits may include MS1 Bit 521, MS2 Bit 522, MS3 Bit 523, MS4 Bit 524, MS5 Bit 525, and MS6 Bit 526.

In various embodiments, the number of bits may be increased or decreased as MS enter or leave an association with an RS. In such an embodiment, the addition the RS and BS may alter the size of the MSID-SH 508 via control or management messages. In one embodiment, messages notifying the addition or reduction of an MS association with the RS may implicitly cause the RS and BS to alter the expected length and, therefore, number of bits, of the MSID-SH 508. In another embodiment, a field may be included within the MSID-SH 508 or other header/sub-header indicating the number of MSs associated with the RS.

In one embodiment, the RS and BS may maintain a list of MS STIDs associated with each RS. In such an embodiment, these MS STIDs may be sorted or ordered in a predicable way (e.g., numerical order of the STID, order of association, etc.), such that both the RS and BS may both understand exactly which MS is being referenced when an ordinal reference (e.g., the third MS) is used. In one embodiment, the MSID-SH 508 may include one or more bits associated with each MS associated with the RS and in an agreed upon order understandable both to the RS and BS.

In such an embodiment, the MPDUs (e.g., MPDU 411, etc.) may be ordered or sorted to correlate with the bitmap of MSID-SH 508. For example, the MPDU 411 from/to the first MS would be placed first, the MPDU from/to the second MS (if such a MPDU exists, which it does not in RPDU 500), would be placed second, and so forth. In various embodiments, if a MS does not contribute a MPDU to the RPDU 500 (e.g., MS2), the position of the following MPDUs (e.g., MPDU 413) may be moved up by one. For example, without a MPDU from MS2, the MPDU 413 from MS3 may be packed in the second position of the payload portion 404. In such an embodiment, multiple MPDUs from a single MS may be aggregated into a single MPDU, as described above, such that multiple MPDUs from a single MS (e.g., MS1) may not appear multiple times in the payload portion 404 of the RPDU 500.

In various embodiments, the MSID-SH 508 may include a bitmap of MSTIDs that correlates with the order in which the MPDUs (e.g., MPDU 411, etc.) are arranged or packed into the payload portion 404 of the RPDU 500. For example, if the MS1 bit 521 is set or "1", the presence of a MPDU from/to the MS1 (e.g., MS1 MPDU 411) would be indicated. Whereas, conversely, a cleared or "0" bit would indicate the absence of a MPDU from/to an associated MS. Therefore, in one embodiment in which the MSID-SH 508 includes the bitmap "101101" would indicate the presence of MPDUs from MSs #1, #3, #4, and #6 (e.g., MPUDs 411, 413, 414, and 416). Although, it is understood that the above are merely a few illustrative examples to which the disclosed subject matter is not limited.

In various embodiments, such an ordered bitmap may facilitate a simple embodiment, in which a device determines the MS associated with a MPDU by performing a Boolean operation (e.g., AND) on the bitmap in a serial order as the device processes the MPDUs in the order they are packed. For example, the first MPDU 411 could be checked against the first bit 521 of the bitmap 508. If the first bit 521 is set (1) the first MPDU 411 may be considered to be form the first MS (MS1). Likewise, as the second MPDU 413 is processed, the second bit 522 is checked. Because, in the illustrated embodiment, the bit 522 is cleared (0), the MPDU 413 is not from the second MS2. So, the third bit 523 is checked. It is set (1). So, the MPDU 413 is assumed to be from the third MS (MS3), and so on. Although, it is understood that the above is merely one illustrative example to which the disclosed subject matter is not limited.

In various embodiments, the MSID-SH 508 may include a field indicating the length of the bitmap, a field indicating the order of the bits in the bitmap, a terminating indicator, or a combination thereof. In various embodiments, the MSID-SH

508 may also include an updated list of STIDs for the MSs (e.g., if a MS is being added or removed from the list); although in a preferred embodiment, such MS STID management may occur in a different message or sub-header, as described above.

Figure 6:
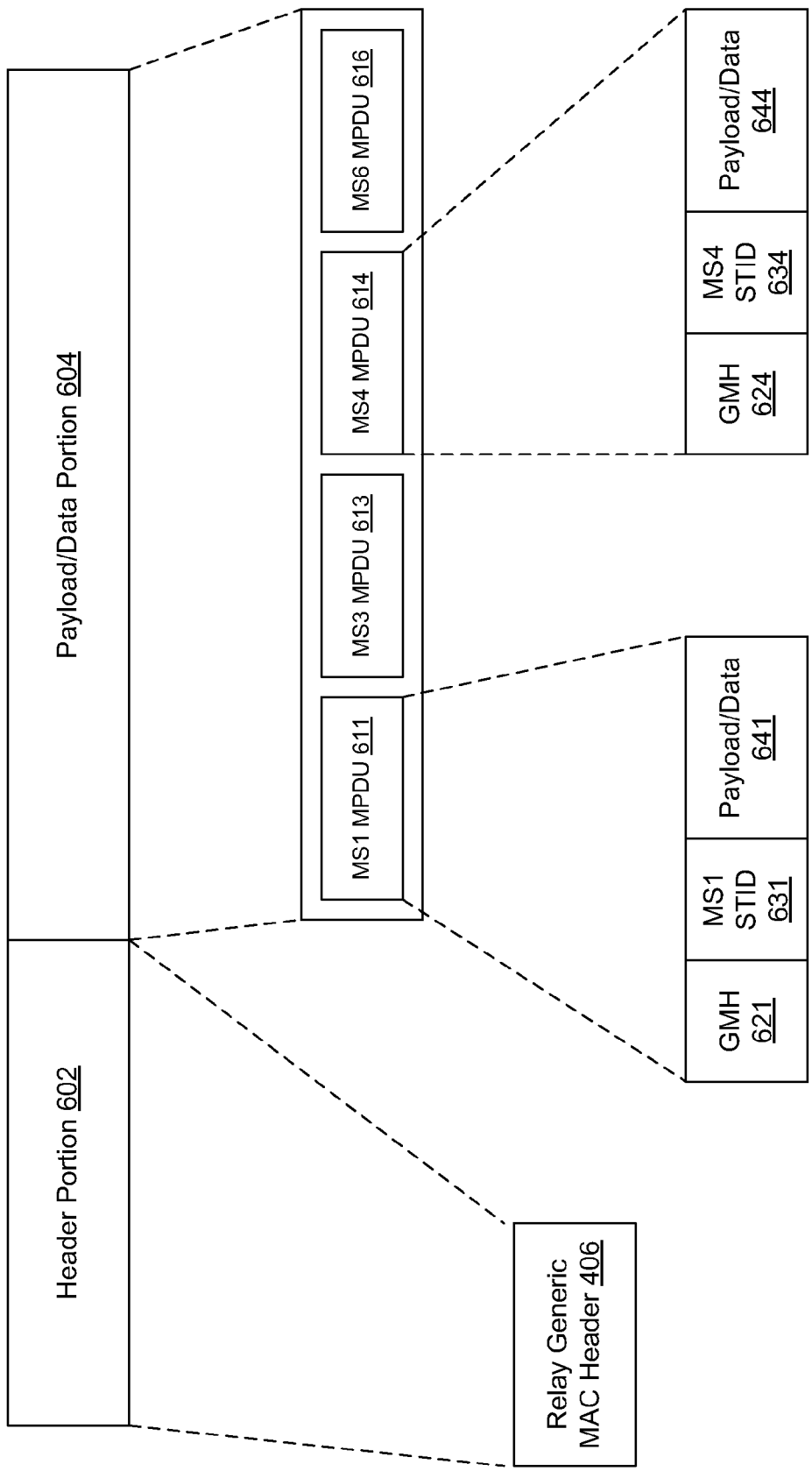
FIG. 6 is a block diagram of an example embodiment of a relay data unit in accordance with the disclosed subject matter.

FIG. 6 is a block diagram of an example embodiment of a relay data unit 600 in accordance with the disclosed subject matter. In various embodiments, the RPDU 600 may include a header portion 602 and a data or payload portion 604. In some embodiments, the RPDU 600 may be created or encoded in such a way that MPDUs (e.g., MPDU 611, etc.) may be associated with their respective MS (e.g., MS1 or MS 106, etc.).

In various embodiments, the payload or data portion 604 of RPDU 600 may include, in one embodiment, one or more MPDUs from one or more respective MSs. For simplicity of illustration like RPDU 400 of FIG. 4, MPDUs from four MSs (MS1, MS3, MS4, and MS6) are illustrated. In such an embodiment, the RS generating or receiving RPDU 600 may be associated with six MSs. In the illustrated embodiment, the payload portion 604 may include the MS1 MPDU 611, the MS3 MPDU 613, the MS4 MPDU 614 and the MS6 MPDU 616; although, it is understood that the above is merely one illustrative example to which the disclosed subject matter is not limited.

In various embodiments, the header portion 602 of the RPDU 600 may include one or more header. In one embodiment, the RPDU 600 may include a relay generic MAC header (GMH) 406. In various embodiments, the header portion 602 may also include a number of various sub-headers. In various embodiments, the header portion 602 may not include a general MSID-SH for the entire RPDU 600, such as RPDUs 400 and 500 of FIGS. 4 and 5 respectively did, as described above.

In various embodiments, an individual MSID-SH may be added to each MPDU (e.g., MPDU 611). In one embodiment, before packing or aggregating the individual MPDUs into the payload portion 604 for the DL, the BS may includes the station identifier (STID) of the MS into the GMH or a sub-header of each individual MPDU. In such an embodiment, the access RS may use the STID in the individual MPDU to generate a DL MAP and may removes the station identifier from the individual MPDUs before forwarding them to the MS over access link.

Likewise in the uplink (UL) direction, before putting the individual MPDUs into the RPDU for the uplink, the access RS may, in one embodiment, include the STID of the MS into the GMH or a sub-header of each individual MPDU. In such an embodiment, the BS may use the STID in the individual MPDU to identify which MS the MPDU belongs to.

In such an embodiment, the MPDU 611 from/to MS1 may include a generic MAC header (GMH) 621, a MSID-SH 631, and a payload or data portion 641. In one embodiment, the MSID-SH 631 may include the STID of MS1, the MS associated with the MPDU 611. As described above, in various embodiments, the MSID-SH 631 or STID of MS1 may be included as part of the GMH 621. In such an embodiment, the MPDUs 613, 614, and 616 may also include respective MSID-SHs (e.g., MSID-SH 634) or modified GMHs (e.g., GMH 624) that include the STID of the MS associated with the respective MPDU (e.g., MS4 for MPDU 614). Although, it is understood that the above are merely a few illustrative examples to which the disclosed subject matter is not limited.

FIG. 7 is a block diagram of an example embodiment of a relay data unit 700 in accordance with the disclosed subject matter. In various embodiments, the RPDU 700 may include a header portion 702 and a data or payload portion 704. In some embodiments, the RPDU 700 may be created or encoded in such a way that MPDUs (e.g., MPDU 711, etc.) may be associated with their respective MS (e.g., MS1 or MS 106, etc.).

In various embodiments, the payload or data portion 704 of RPDU 700 may include, in one embodiment, one or more MPDUs from one or more respective MSs. For simplicity of illustration like RPDU 400 of FIG. 4, MPDUs from four MSs (MS1, MS3, MS4, and MS6) are illustrated. In such an embodiment, the RS generating or receiving RPDU 700 may be associated with six MSs. In the illustrated embodiment, the payload portion 704 may include the MS1 MPDU 711, the MS3 MPDU 713, the MS4 MPDU 714 and the MS6 MPDU 716; although, it is understood that the above is merely one illustrative example to which the disclosed subject matter is not limited.

In various embodiments, the header portion 702 of the RPDU 700 may include one or more header. In one embodiment, the RPDU 700 may include a relay generic MAC header (GMH) 706. In various embodiments, the header portion 702 may also include a number of various sub-headers. In various embodiments, the header portion 702 may not include a general MSID-SH for the entire RPDU 700, such as RPDUs 400 and 500 of FIGS. 4 and 5 respectively did, as described above.

In various embodiments, a PDU (e.g., a MPDU) may include an error correction or detection portion. In some embodiments, this error correction or detection scheme may include a cyclic redundancy check (CRC). In this context, cyclic redundancy check may include a type of hash function used to produce a checksum that is often used to detect errors in transmission or storage.

In various embodiments, a packing device (e.g., an RS, BS, etc.) may generate an error detection portion (hereafter, referred to as "a CRC"; although, it is understood that the above is merely one illustrative example to which the disclosed subject matter is not limited). In one embodiment, the MPDU generating device (e.g., a MS, BS, etc.) may generate a CRC. In yet another embodiment, the MPDU generating device may generate a CRC, which is then replaced by the packing device.

In one embodiment, the CRC creating device may mask the CRC portion (e.g., MS1 CRC 751) with the STID of the associated MS. In such an embodiment, the accessing RS in the DL direction, and the BS in the UL direction may use the masked CRC portion to detect which MS the MPDU is associated with. For example, the RS may perform a Boolean operation against the CRC portion (e.g., MS1 CRC 751) to determine if it has been masked with the STID of the MS1. In various embodiments, the RS and BS may maintain a list of the STIDs associated with a given RS or routing tunnel. In such an embodiment, the RS/BS may have a limited number of STIDs from which to compare the CRC portion of the MPDUs.

In one embodiment in which the list of STIDs is in a known order (as described above), the packing device (e.g., RS, BS, etc.) may pack the MPDUs in the same order as the list of STIDs. In such an embodiment, the processing efficiency (e.g., delay, power, etc.) may be increased by performing less STID evaluations on the later MPDUs as all the MPDUs from first MSs are processed the list of possible STIDs is reduced. For example, in an embodiment with 6 MSs and STIDs, once the MPDUs from the first MS are processed the number of possible STIDs falls from 6 to 5, as so forth. Although, it is understood that the above is merely one illustrative example to which the disclosed subject matter is not limited. In various embodiments, all the MPDUs from a single MS may be aggregated into a single MPDU. Alternately, in another embodiment, the multiple MPDUs from a single MS may exist within an RPDU.

In such an embodiment, the MPDUs (e.g., MPDUs 711, and 714) may include a GMH portion (e.g., GMHs 721 and 724), a payload or data portion (e.g., payloads 721 and 724), and a CRC or error detection portion (e.g., CRC 751 and 754). In such an embodiment, the CRC 751 may be masked with the STID of MS1. Likewise, the CRC 754 may be masked with the STID of MS4, and so on. Although, it is understood that the above is merely one illustrative example to which the disclosed subject matter is not limited.

In various embodiments, the addressing or identification schemes illustrated by FIGS. 4, 5, 6, and 7 may be combined in whole or part; although this may not lead to ideal or efficient embodiments. For example, in one embodiment, a RPDU may include both MPDUs with the MSID-SHs described in relation to FIG. 6 (e.g., MPDU 611) and MPDUs with the MSID masking the error detection portion of the MPDU as described in relation to FIG. 7 (e.g., MPDU 714). In such an embodiment, the receiving device may be configured to select the STID associated with the MPDU based upon a system of rules that prioritize the schemes possible. Likewise, the packing device may be configured to select a STID scheme based upon similar a system of rules. Although, it is understood that the above are merely a few illustrative examples to which the disclosed subject matter is not limited. It is also understood that other STID transmittal or association schemes are possible, even if not described in detail, and are within the scope of the claimed subject matter.

FIG. 8 is a flow chart of an example embodiment of a technique 800 in accordance with the disclosed subject matter. In various embodiments, the technique 800 may result in RPDUs as illustrated by FIGS. 4, 5, 6, and 7, as described above. In some embodiments, the technique 800 may be employed by devices or apparatuses illustrated by FIGS. 1, 2, and 3, as described above. Although, it is understood that the above are merely a few illustrative examples to which the disclosed subject matter is not limited.

Block 802 illustrates that, in one embodiment, at least one Mobile Station (MS) Medium Access Control (MAC) Packet Data Units (PDUs), associated with at least one Mobile Station, may be collected, as described above. In various embodiments, several MPDUs from a single MS may be grouped together into one MPDU, as described above. In various embodiments, the action(s) illustrated by this block may be performed by various elements, such as the BS 204 and/or RS 220 of FIG. 2, the apparatus 301, the processor 304, and/or the memory 306 of FIG. 3, as described above.

Blocks 804 & 806, and Block 808 & 810 illustrate different embodiments of the technique 800 that may be performed in various embodiments. In various embodiments, the selection of which set of Blocks to perform may be made dynamically or statically (e.g., a standardized operation, a configurable settings, etc.). In some embodiments, these sets of blocks may be mutually exclusive. In another embodiment, actions may be performed that may be described or illustrated by both sets of Blocks.

Block 804 illustrates that, in one embodiment, at least one MS station identifier (STID) sub-header (MSID-SH), may be generated indicating for each MS MAC PDU (MPDU) a MS STID that is associated the respective MPDU, as described above. In one embodiment, generating may include arranging a list of MSIDs indicators in the same order as the MPDUs, as described above. In another embodiment, generating may include listing, for each MPDU, a MS STID associated with the respective MPDU in the order in which the MPDUs are packed, as described above. In various embodiments, the MSID-SH may include an indication of the number of MS-STIDs included in the MSID-SH and at least one MS-STID, as described above. In yet another embodiment, generating may include generating a bitmap of MS STIDs correlated with the order in which the MPDUs are packed into the RMDU, as described above. In one more embodiment, generating may include generating a MSID-SH for each MPDU, wherein the MSID-SH includes the MS STID of the respective MPDU, as described above. In various embodiments, several MPDUs from a single MS may be grouped together into one MPDU, as described above. In various embodiments, the action(s) illustrated by this block may be performed by various elements, such as the BS 204 and/or RS 220 of FIG. 2, the apparatus 301, the processor 304, and/or the memory 306 of FIG. 3, as described above.

Block 806 illustrates that, in one embodiment, the MSID-SH and the at least one of MPDU may be packed into a single Relay MAC PDU (RPDU), as described above. In various embodiments, packing may include, for each MPDU, inserting the respective MSID-SH into to the respective MPDU, as described above. In another embodiment, packing may include packing the at least one of MPDU into a payload portion, packing the MSID-SH into a header portion, and combining the header portion and payload portion into a RPDU, as described above. In various embodiments, the action(s) illustrated by this block may be performed by various elements, such as the BS 204 and/or RS 220 of FIG. 2, the apparatus 301, the processor 304, and/or the memory 306 of FIG. 3, as described above.

Block 808 illustrates that, in one embodiment, a portion of each MS MAC PDU (MPDU) may be embedded with an indication of a MS station identifier (STID) associated with the MPDU, as described above. In various embodiments, embedding may include masking at least a portion of each MS MAC PDU (MPDU) with a MS station identifier (STID) associated with the MPDU, as described above. In some embodiments, masking may include masking an error detection portion of the MPDU with the MS STID associated with the MPDU, as described above. In various embodiments, the error detection portion may include a cyclic redundancy check (CRC), as described above. In another embodiment, embedding may include generating a MSID-SH for each MPDU, wherein the MSID-SH includes the MS STID of the respective MPDU, as described above. In various embodiments, the action(s) illustrated by this block may be performed by various elements, such as the BS 204 and/or RS 220 of FIG. 2, the apparatus 301, the processor 304, and/or the memory 306 of FIG. 3, as described above.

Block 810 illustrates that, in one embodiment, the at least one of MPDU may be packed into a single Relay MAC PDU (RPDU), as described above. In one embodiment, packing may include for each MPDU, inserting the respective MSID-SH into to the respective MPDU, as described above. In various embodiments, the action(s) illustrated by this block may be performed by various elements, such as the BS 204 and/or RS 220 of FIG. 2, the apparatus 301, the processor 304, and/or the memory 306 of FIG. 3, as described above.

Block 812 illustrates that, in one embodiment, the RPDU may be wirelessly transmitted, as described above. In various embodiments, transmitting ma include the use of the 802.16m standard, as described above. In various embodiments, the action(s) illustrated by this block may be performed by various elements, such as the BS 204 and/or RS 220 of FIG. 2, the apparatus 301, the processor 304, and/or the transceiver 302 of FIG. 3, as described above.

FIG. 9 is a flow chart of an example embodiment of a technique 900 in accordance with the disclosed subject matter. In various embodiments, the technique 900 may utilize RPDUs as illustrated by FIGS. 4, 5, 6, and 7, as described above. In some embodiments, the technique 900 may be employed by devices or apparatuses illustrated by FIGS. 1, 2, and 3, as described above. Although, it is understood that the above are merely a few illustrative examples to which the disclosed subject matter is not limited.

Block 902 illustrates that, in one embodiment, a Relay Medium Access Control (MAC) Packet Data Unit (PDU) may be wirelessly received, as described above. In one embodiment, receiving may include the use of the 802.16m standard, as described above. Block 904 illustrates that, in one embodiment, the RPDU may include at least one mobile station (MS) station identifier (STID) sub-header (MSID-SH) and at least one MS MAC PDU (MPDU), as described above. Block 906 illustrates that, in one embodiment, the RPDU may include at least one MS MAC PDU (MPDU), wherein each MPDU includes an indication of a MS station identifier (STID) associated with the MPDU, as described above. In various embodiments, these Blocks 904 and 906 may be mutually exclusive. In other embodiments, the RPDU may fulfill the requirements described in both Blocks 904 and 906, as described above. In various embodiments, the action(s) illustrated by these blocks may be performed by various elements, such as the BS 204 and/or RS 220 of FIG. 2, the apparatus 301, the processor 304, and/or the transceiver 302 of FIG. 3, as described above.

Block 908 illustrates that, in one embodiment, the MPDUs included in the Relay MAC PDU (RPDU) may be unpacked, as described above. In one embodiment, unpacking may include, for each MPDU, examining the MPDU to determine if it includes a MSID-SH, as described above. In various embodiments, the action(s) illustrated by this block may be performed by various elements, such as the BS 204 and/or RS 220 of FIG. 2, the apparatus 301, the processor 304, and/or the memory 306 of FIG. 3, as described above.

Block 910 illustrates that, in one embodiment, if the RPDU fulfills the description of Block 904, each MPDU may be associated with a MS-STID based at least in part upon the MSID-SH, as described above. In one embodiment, the MSID-SH may include a MS-STID for each MPDU, and associating may include assigning a MS-STID to each MPDU based upon the order in which the MS-STIDs are arranged in the RPDU and the order in which the MPDUs are arranged in the RPDU, as described above. In another embodiment, the MSID-SH may include a bitmap indicating which MSs have MPRUs in the RPDU, and associating may include associating each bit of the bitmap with each MPDU based upon the order in which the bits of the bitmap are arranged and the order in which the MPDUs are arranged in the RPDU, and using the position of each bit in the bitmap to determine a MS-STID to associate with the MPDUs of the RPDU, as described above. In yet another embodiment, each MPDU may include a MSID-SH and associating may include for each MPDU, if the MPDU includes a MSID-SH that includes a STID, associating the STID with the MPDU, as described above. In various embodiments, the action(s) illustrated by this block may be performed by various elements, such as the BS 204 and/or RS 220 of FIG. 2, the apparatus 301, the processor 304, and/or the memory 306 of FIG. 3, as described above.

Block 912 illustrates that, in one embodiment, if the RPDU fulfills the description of Block 906, each MPDU may be associated with a MS-STID based upon the STID indication, as described above. In one embodiment, associating may include unmasking at least a portion of each MS MAC PDU (MPDU) to determine a MS station identifier (STID) associated with the MPDU, as described above. In another embodiment, associating may include unmasking an error detection portion of the MPDU to determine a MS STID associated with the MPDU, as described above. In various embodiments, the error detection portion may include a cyclic redundancy check (CRC), as described above. In yet another embodiment, associating may include retrieving a MSID-SH from each MPDU, wherein the MSID-SH includes the MS STID of the respective MPDU, and for each MPDU, associating the respective MSID-SH with the MPDU, as described above. In various embodiments, the action(s) illustrated by this block may be performed by various elements, such as the BS 204 and/or RS 220 of FIG. 2, the apparatus 301, the processor 304, and/or the memory 306 of FIG. 3, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
   collecting a plurality of Mobile Station (MS) Medium Access Control (MAC) Packet Data Units (PDUs), including at least one MS MAC PDU (MPDU) associated with each of a plurality of different mobile stations, one or more of the MPDUs including a connection identifier (CID);
   generating at least one MS station identifier (STID) sub-header (MSID-SH), the MSID-SH including a plurality of MS station identifiers (STIDs) including a MS STID for each of the collected MPDUs, with each MS STID uniquely identifying the MS associated with the MPDU;
   packing the MSID-SH and the plurality of MPDUs into a single Relay MAC PDU (RPDU); and
   wirelessly transmitting the RPDU.

2. The method of claim 1 wherein collecting includes grouping a plurality of MPDUs associated with a single MS, into a single MPDU.

3. The method of claim 1 wherein either collecting or generating includes:
   arranging the MPDUs in an order; and
   wherein generating includes:
   arranging a list of MSIDs indicators in the same order as the MPDUs.

4. The method of claim 1 wherein generating includes:
   listing, for each MPDU, a MS STID associated with the respective MPDU in the order in which the MPDUs are packed.

5. The method of claim 1 wherein the MSID-SH includes:
   an indication of the number of MS-STIDs included in the MSID-SH; and
   a plurality of MS STIDs.

6. The method of claim 1 wherein generating includes:
   generating a bitmap of MS STIDs correlated with the order in which the MPDUs are packed into the RPDU.

7. The method of claim 1 wherein generating includes
   generating a MSID-SH for each MPDU, wherein the MSID-SH includes the MS STID of the respective MPDU; and
   wherein packing includes:
   for each MPDU, inserting the respective MSID-SH into to the respective MPDU.

8. The method of claim 1 wherein packing includes:
   packing the plurality of MPDUs into a payload portion;
   packing the MSID-SH into a header portion; and
   combining the header portion and payload portion into the RPDU.

9. An apparatus comprising:
   a processor configured to:
     receive a Relay Medium Access Control (MAC) Packet Data Unit (RPDU) via a wireless communications channel, the RPDU including at least one mobile station (MS) station identifier (STID) sub-header (MSID-SH) and a plurality of MS MAC PDUs (MPDUs) with one or more of the MPDUs including a connection identifier (CID), the plurality of MPDUs including at least one MPDU associated with each of a plurality of different MSs, the MSID-SH including a plurality of MS STIDs including a MS STID for each of the MPDUs with each MS STID uniquely identifying the MS associated with the MPDU;
     unpack the MPDUs included in the Relay MAC PDU (RPDU); and
     associate each MPDU with a MS-STID using the MSID-SH.

10. The apparatus of claim 9 wherein the MSID-SH includes:
    a MS-STID for each MPDU; and
    wherein the processor is configured to:
      assign a MS-STID to each MPRDU based upon the order in which the MS-STIDs are arranged in the RPDU and the order in which the MPDUs are arranged in the RPDU.

11. The apparatus of claim 9 wherein the MSID-SH includes:
    a bitmap indicating which MSs have MPDUs in the RPDU; and
    wherein the processor is configured to:
      associate each bit of the bitmap with each MPDU based upon the order in which the bits of the bitmap are arranged and the order in which the MPDUs are arranged in the RPDU, and
      based upon the position of each bit in the bitmap to determine one of the MS STIDs to associate with each of the MPDUs of the RPDU.

12. The apparatus of claim 9 wherein the processor is configured to:
    for each MPDU,
    examine the MPDU to determine if it includes a MSID-SH, and
    if the MPDU includes a MSID-SH that includes a STID, associate the STID with the MPDU.

13. A method comprising:
    collecting a plurality of Mobile Station (MS) Medium Access Control (MAC) Packet Data Units (PDUs) including at least one MS MAC PDU (MPDU) associated with each of a plurality of different mobile stations (MSs), one or more of the MPDUs including a connection identifier (CID);
    embedding a portion of each MS MAC PDU (MPDU) with an indication of a MS station identifier (STID) associated with the MPDU, with each MS STID uniquely identifying the MS associated with the MPDU;
    packing the plurality of embedded MPDUs into a single Relay MAC PDU (RPDU); and
    wirelessly transmitting the RPDU.

14. The method of claim 13 wherein embedding includes:
    masking at least a portion of each MS MAC PDU (MPDU) with a MS station identifier (STID) associated with the MPDU.

15. The method of claim 13 wherein masking includes masking an error detection portion of the MPDU with the MS STID associated with the MPDU.

16. The method of claim 15 wherein the error detection portion includes a cyclic redundancy check.

17. The method of claim 13 wherein embedding includes:
    generating a MSID-SH for each MPDU, wherein the MSID-SH includes the MS STID of the respective MPDU; and
    wherein packing includes:
    for each MPDU, inserting the respective MSID-SH into to the respective MPDU; and
    packing the plurality of MPDUs into a single Relay MAC PDU (RPDU).

* * * * *

UNITED STATES PATENT AND TRADEMARK OFFICE
CERTIFICATE OF CORRECTION

PATENT NO.         : 8,428,030 B2
APPLICATION NO.    : 12/607596
DATED              : April 23, 2013
INVENTOR(S)        : Haihong Zheng et al.

It is certified that error appears in the above-identified patent and that said Letters Patent is hereby corrected as shown below:

On Title page, Item (57), under "ABSTRACT", in column 2, line 7, delete "the" and insert -- with the --, therefor.

In the Claims

In column 15, line 45, In Claim 7, after "into" delete "to".

In column 16, line 9, In Claim 10, delete "MPRDU" and insert -- MPDU --, therefor.

In column 16, line 61, In Claim 17, after "into" delete "to".

Signed and Sealed this
Twenty-ninth Day of October, 2013

Teresa Stanek Rea
*Deputy Director of the United States Patent and Trademark Office*